Patented Jan. 11, 1949

2,458,819

UNITED STATES PATENT OFFICE 2,458,819

PURIFYING ALKYL HALIDES

Howard L. Yowell, Elizabeth, and Charles E. Morrell, Westfield, N. J., assignors to Standard Oil Development Company, a corporation of Delaware No Drawing. Application September 23, 1944, Serial No. 555,589

4 Claims. (Cl. 210—42.5)

The invention relates to catalytic reactions involving the use of Friedel-Crafts catalysts and relates more particularly to a method for purifying the reactants submitted to such catalysis.

Friedel-Crafts catalysts have been widely used industrially for a large number of catalytic reactions such as condensation of aromatics with alkyl halides, polymerization of olefins in gases, alkylation of isoparaffins with olefins, copolymerization of diolefins with various reactants to form various synthetic rubbers, etc. Such Friedel-Crafts catalysts include aluminum chloride, aluminum bromide, zinc chloride, boron fluoride, stannic chloride, etc. These catalysts are easily poisoned by the presence of organic oxygenated compounds such as alcohols, ethers, aldehydes, esters, etc. This is particularly true of the aluminum chloride catalyst and is one of the major problems confronting the manufacturer of synthetic rubbers when using this catalyst. For example in the preparation of butyl rubber it is necessary that the amount of methyl ether present in the feed stocks not exceed 0.01% and preferably 0.005%. It is therefore, important that the feed stock submitted to treatment with these catalysts be free from such contaminating organic oxygenated compounds.

It is therefore an object of this invention to prevent poisoning of the Friedel-Crafts type metallic halides by organic oxygenated compounds.

It is a further object of this invention to pretreat the reactants to be submitted to catalysis in the presence of Friedel-Crafts type metal halides so as to remove contaminating organic oxygented compounds therefrom.

In the preparation of synthetic rubbers when using aluminum chloride as a catalyst for the copolymerization of diolefins with other reactants such as styrene, acrylonitrile, isobutylene, etc., it is usual to conduct the reaction in the presence of a solution of aluminum chloride in a non-complex-forming, non-poisoning solvent, such as an alkyl halide. Of these alkyl halides, methyl chloride is the most commonly used but other halides such as ethyl chloride, ethyl bromide and the like may be used, provided they are liquid at the temperature of reaction which in general is below 0° C. and is usually about —100° C.

The alkyl halides used as solvents for the metal halide catalysts are commonly prepared by esterifying the corresponding alcohols. As a result of such a reaction the alkyl halide formed contains a small amount of unreacted alcohol and by-product ether. Since the amounts of these contaminants are rather small the usual purification methods such as fractional distillation, solvent extraction, etc. are not practical. Furthermore, the removal of these contaminants by fractional distillation is in many cases made almost impossible by the closely related boiling point of the alkyl halide and the contaminant. For example when preparing methyl chloride by esterification of methyl alcohol with dry hydrogen chloride a very small amount of dimethyl ether is formed which has a boiling point within 1° C. of that of methyl chloride. Thus, it is not feasible to separate the ether by fractional distillation. Furthermore the amount of dimethyl ether is between 0.1 and 0.01% so that solvent extraction is also not practical.

According to the present invention oxygenated contaminants present in the feed stock to a catalytic reaction using metal halide catalysts, which would be poisoned by the contaminants, are removed by selective adsorption over solid adsorbents. The most suitable adsorbent for this purpose is silica gel but other adsorbents such as alumina, activated carbon, clays, bauxite, etc. are also suitable. It is the purpose of this invention to remove these contaminants from all the participating reactants or from any diluent present which might contain such contaminants. In any case the reactant or diluent containing the contaminant is passed over the solid adsorbent in liquid or vapor phase under pressures from atmospheric or slightly below atmospheric to 100 atmospheres or higher and at temperatures ranging from the freezing point of the materials treated up to 40 to 50° C.

The advantages of the present invention are shown in the following table presenting data from a process in which dimethyl ether was selectively adsorbed by passing methyl chloride at 30° C. and atmospheric pressure over silica gel and alumina:

| Initial Mol Per cent $(CH_3)_2O$ in $CH_3Cl$ | Mol Per cent $(CH_3)_2O$ in exit MeCl | Adsorbent | Time on Stream | Contact Time in Seconds |
|---|---|---|---|---|
| | | | Minutes | |
| 0.136 | 0.005 | Silica gel | 30 | 17 |
| 0.136 | 0.003 | do | 60 | 17 |
| 0.136 | 0.017 | Alumina | 18 | 17 |
| 0.136 | 0.06 | do | 51 | 17 |
| 1.36 | 0.005 | Silica gel | 56 | 17 |
| 1.36 | 0.036 | do | 181 | 17 |

Since the methyl ether content of the treated methyl chloride should be below 0.01 and preferably below 0.005% it is evident from the above table that the methyl chloride passed over silica gel has had its methyl ether content reduced to a point where it is suitable for use as a solvent for aluminum chloride in a subsequent reaction for preparing butyl rubber from isobutylene and isoprene using aluminum chloride as a catalyst. The conditions given in the example are not to be considered limiting but only illustrative. For example, in large scale practice it would be desirable to operate under a pressure of several atmospheres, e. g. 40 to 50 lbs./sq. in.

Such low ether contents require careful control of the treating cycle so that a shift must be made to fresh or regenerated silica gel before the methyl ether in the treated gas reaches about .01%. The treating agent can be regenerated by heating either under high vacuum or while passing over it an ether-free stripping gas such as nitrogen, methane, natural gas, etc. Suitable regeneration temperatures are about 300 to 500° F. and the heating should be continued until the treating agent is substantially free of methyl ether. This will depend on the degree of vacuum or the stripping gas rate as well as upon temperature and may suitably be about 4 to 12 hours per cycle. The regenerated treating agent should be cooled to about 100° F. or less before it is placed again on stream. The methyl chloride may also be treated at much lower temperatures, in either gas or liquid phase.

While silica gel has been shown to be the most suitable reagent for removing methyl ether from methyl chloride which is to be used as the catalyst solvent in the preparation of butyl rubber, the data indicate that the alumina also reduces the ether content and therefore would be suitable in those cases in which the presence of larger amounts of ether could be tolerated.

While the above example has been limited to the adsorption of dimethyl ether from methyl chloride, the invention is not to be considered so limited but is to be considered broadly as a means for removing contaminating oxygenated compounds from reacting hydrocarbon mixtures and/or any diluents or solvents used therewith, with particular reference to the use of these hydrocarbon mixtures and diluents in Friedel-Crafts reactions or other reactants using such catalysts.

The nature and objects of the present invention having thus been set forth and a specific illustration of the same given, what is claimed as new and useful and desired to be secured by Letters Patent is:

1. The process for removing small contaminating amounts of alkyl ethers from alkyl halides which comprises contacting in the fluid state the alkyl halides containing about 0.1% of alkyl ether with silica gel and withdrawing from said silica gel an alkyl halide containing less than 0.01% of alkyl ethers.

2. The process for removing small amounts of dimethyl ether from methyl chloride which comprises contacting the methyl chloride containing about 0.1% of dimethyl ether with silica gel at about 30° C. and withdrawing methyl chloride from said silica gel containing less than 0.01% of dimethyl ether.

3. The process for removing small contaminating amounts of an alkyl ether from alkyl halides which comprises contacting in the fluid state alkyl halide containing about 0.1% of alkyl ether with silica gel by passing said alkyl halide into an absorber charged with silica gel, continuously withdrawing purified alkyl halide from the absorber, maintaining the absorber on stream until the content of alkyl ether in the alkyl halide withdrawn from the absorber reaches about 0.01%, discontinuing the supply of said alkyl halide to the absorber, stripping the silica gel at about 300–500° F. until it is substantially free from alkyl ether, cooling the silica gel to below 100° F. and again placing the absorber on stream by passing alkyl halide containing about 0.1% of alkyl ether thereinto.

4. The process of removing small contaminating amounts of dimethyl ether from methyl chloride, which comprises contacting in the fluid state alkyl halide containing about 0.1% of dimethyl ether with silica gel by passing said alkyl halide into an absorber charged with silica gel, continuously withdrawing purified methyl chloride from the absorber, maintaining the absorber on stream until the content of dimethyl ether in the methyl chloride reaches about 0.01%, discontinuing the supply of said methyl chloride to the absorber, stripping the silica gel at about 300–500° F. until it is substantially free from dimethyl ether, cooling the silica gel to below 100° F. and again placing the absorber on stream by passing methyl chloride containing about 0.1% of dimethyl ether thereinto.

HOWARD L. YOWELL.
CHARLES E. MORRELL.

REFERENCES CITED

The following references are of record in the file of this patent:

UNITED STATES PATENTS

| Number | Name | Date |
|---|---|---|
| 1,656,504 | Schwab | Jan. 17, 1928 |
| 1,722,871 | Weber et al. | July 30, 1929 |
| 2,203,690 | Malm et al. | June 11, 1940 |
| 2,203,873 | Mueller-Cunradi | June 11, 1940 |
| 2,270,285 | Frolich | Jan. 20, 1942 |
| 2,276,893 | Thomas | Mar. 17, 1942 |

OTHER REFERENCES

Dietz, "Bibliography of Solid Adsorbents," pg. 266, abstract of article by Bartell et al., pg. 272, abstract of article by Rao et al.

Bartell et al., J. A. C. S., vol 53, pgs. 2501 to 2511, July 1931, Rao, Proc. Indian Academy of Sciences vol. 4, pgs. 562–570, Nov. 1936.